EFFECT OF TEMPERATURE ON $Na_2CO_3$ SOLUBILITY AND PERCENT CAUSTICITY IN SYNTHETIC SPENT BAYER SOLUTIONS CONTAINING 150 TO 248 g/l CAUSTIC

Fig. 3.

EFFECT OF TEMPERATURE ON $Na_2CO_3$
SOLUBILITY AND PERCENT CAUSTICITY
IN WORKS 'A' SPENT BAYER SOLUTIONS
CONTAINING 151 TO 245 g/l CAUSTIC

Fig. 4.

EFFECT OF TEMPERATURE ON $Na_2CO_3$ SOLUBILITY AND PERCENT CAUSTICITY IN WORKS 'E' SPENT BAYER SOLUTION CONTAINING 149 TO 248 g/l CAUSTIC

Fig. 5.

EFFECT OF DECREASING TEMPERATURE ON $Na_2SO_4$ CONCENTRATIONS IN ACTUAL PLANT WORKS BAYER SPENT SOLUTIONS AT DIFFERENT CAUSTIC CONCENTRATIONS

INVENTORS
STEPHEN OSTAP
BY DENIS BARTOK

Robert S. Dunham
ATTORNEY

Fig. 6.

EFFECT OF DECREASING TEMPERATURE ON SODIUM CARBONATE CONCENTRATION AND CAUSTICITY OF BAYER PLANT SPENT LIQUOR AT INITIAL CAUSTICITY

United States Patent Office 3,508,884
Patented Apr. 28, 1970

3,508,884
REMOVAL OF SODIUM CARBONATE AND SODIUM SULFATE FROM BAYER SOLUTIONS
Stephen Ostap and Denis Bartok, Arvida, Quebec, Canada, assignors to Alcan Research and Development, Limited, Ottawa, Ontario, Canada
Filed Feb. 3, 1967, Ser. No. 613,855
Int. Cl. B01d 9/02
U.S. Cl. 23—302                2 Claims

ABSTRACT OF THE DISCLOSURE

In the Bayer process, bauxite is digested in caustic-aluminate solution to dissolve the alumina. After the caustic-insoluble impurities are separated, the alumina is recovered from the pregnant aluminate solution by cooling and seeding with gibbsite. The spent aluminate solution contains some carbonate as an undesirable impurity. Sodium carbonate and other materials, such as sodium sulfate, are removed from the spent aluminate solution, without otherwise concentrating the spent solution, by low temperature crystallization.

BACKGROUND OF THE INVENTION

Field of the invention

This invention relates to the treatment of bauxite for the production of alumina therefrom. More specifically, this invention relates to the Bayer process for the treatment of bauxite wherein bauxite is digested in a caustic solution to form a pregnant sodium aluminate solution, leaving behind undissolved caustic insoluble materials, such as iron oxide, which may be present in the bauxite. Alumina is recovered from the pregnant aluminate solution by cooling and seeding with gibbsite. The resulting spent aluminate solution is then desirably returned to the process. Often the spent aluminate solution contains caustic soluble impurities, such as sodium carbonate, which tend to build up in the system when the spent aluminate solution is returned to the process. The presence of sodium carbonate in certain amounts in the Bayer process liquors tends to inhibit the precipitation of the alumina and limit overall productivity of the alumina recovery operation.

DESCRIPTION OF THE PRIOR ART

Various methods are known to reduce the carbonate content of spent Bayer solutions. One method of reducing the carbonate content of high causticity spent Bayer process solutions is to causticize either a diluted strong Bayer liquor or a dilute Bayer mud washing stream. The disadvantages are the cost of diluting and concentrating the strong Bayer liquor and the fact that there may be insufficient carbonate in the Bayer mud washing circuit to significantly affect the causticity of the main Bayer circuit. Another method involves mixing the whole spent Bayer liquor with bauxite or alumina hydrate followed by calcining the resulting admixture to convert the sodium carbonate to sodium aluminate. Another method of removing sodium carbonate from spent Bayer solutions involves concentrating spent Bayer liquor by evaporation to cause precipitation of sodium carbonate as $Na_2CO_3 \cdot H_2O$. This method of removing sodium carbonate as $Na_2CO_3 \cdot H_2O$ is based on the decreasing solubility of sodium carbonate with an increase in caustic concentration.

One of the main difficulties of the concentration by evaporation process for the precipitation of sodium carbonate is due to the fact that the solids precipitated from a high causticity, high organic spent Bayer solution are difficult to separate because of their small crystal size and the viscosity of the resulting concentrated solution, see U.S. Patent 2,806,766 and French Patent 1,386,-328. The removal and recovery of soda from Bayer process liquids is also discussed in the Bureau of Mines, United States Department of the Interior Publication R.I. 4126 of September 1946 entitled "Recovery of Soda and Removal of Sulfate in the Lime-Soda Process for Alumina Production" by Francis J. Frattali et al., and also in the Transactions American Institute of Chemical Engineers, vol. XLI–1945 entitled "The Recovery of Soda in the Lime-Soda Sinter Process for the Production of Alumina" by James M. Hall et al.

SUMMARY OF THE INVENTION

Soda values, such as sodium carbonate and sodium sulfate, are recovered from spent Bayer solutions containing the same dissolved therein by subjecting the spent Bayer solution to a temperature below about 10° C., such as a temperature in the range from about −10° C. to about −15° C., effective to precipitate the sodium carbonate contained in said solution in the form of crystalline sodium carbonate decahydrate, followed by recovery of the resulting precipitated sodium carbonate decahydrate, preferably by filtration, from the resulting cooled spent Bayer solution.

BRIEF DESCRIPTION OF THE DRAWINGS

The practice of this invention in accordance with one or more embodiments thereof is illustrated in the accompanying drawings wherein FIG. 1 schematically illustrates a flow scheme showing the practice of this invention as applied to the recovery of sodium carbonate and sodium sulfate from spent Bayer solution containing sodium carbonate and sodium sulfate dissolved therein and involving causticizing the resulting precipitated and recovered sodium carbonate with lime to convert the sodium carbonate to sodium hydroxide for subsequent use in the Bayer process for the treatment of bauxite and the recovery of alumina therefrom, and wherein FIGS. 2–6 graphically illustrate the practices of this invention and the advantages derivable therefrom.

DESCRIPTION OF THE INVENTION

In the Bayer process for the production of alumina, as alumina hydrate, bauxite is digested in an aqueous caustic-aluminate solution to dissolve the alumina. The caustic-insoluble impurities, such as iron oxide, present in the bauxite are separated from the resulting pregnant aluminate solution by either decantation or filtration. Alumina, as alumina hydrate, is then recovered from the pregnant aluminate solution by cooling and seeding with gibbsite.

All Bayer solutions contain some sodium carbonate as an undesirable impurity. Sodium carbonate is an undesirable impurity since it inhibits the gibbsite precipitation rate and limits productivity. In some commercial Bayer plants the amount of sodium carbonate present in the Bayer solution in process is maintained at a constant elevated level by the extraneous addition of sodium carbonate. In such plants the entire process caustic loss is made up by so-called "inside causticization," i.e. lime is charged with the bauxite to react with the extraneous added sodium carbonate during Bayer digestion to produce caustic. Sodium carbonate in the Bayer solution, although an undesirable impurity, is necessary for caustic generation in such an operation.

Even when extraneous soda or sodium carbonate is not added, that is where "inside causticization" is not used but liquid caustic added instead for caustic make-up, sodium carbonate still accumulates in the Bayer process solutions due to (1) variations in the organic and silica content of the bauxite, (2) the organic materials, such as flour, added in the process to improve the settling and filtration of the caustic-insoluble impurities. Also, sodium carbonate will form from other sources, such as tramp limestone present in the bauxite which produces sodium carbonate in the Bayer solution either by limestone reversion or by reaction with caustic-soluble phosphate in the bauxite.

As indicated hereinabove sodium carbonate in Bayer process solutions is undesirable because it inhibits the gibbsite precipitation rate in the precipitation stage and limits solution productivity by preventing the plant from operating at maximum caustic level. If solution carbonation takes place during the Bayer process at a rate to require control by the extraneous addition of lime, the caustic level cannot be increased too high since the lime will react with sodium aluminate instead of with the sodium carbonate to give lime and alumina losses. If solution carbonation or sodium carbonate formation does not take place at a rate which requires control by the extraneous addition of lime but if the sodium carbonate is present in Bayer liquors in an excessive amount, the process caustic level cannot be increased because of resulting increase in process solution viscosity. If, however, the sodium carbonate level could be decreased the caustic-aluminate level could be increased without affecting the viscosity. The causticity, i.e. percent causticity, of Bayer solutions is defined as the caustic, expressed as sodium carbonate $Na_2CO_3$, divided by the total titratable soda (TTS) multiplied by 100.

Sodium carbonate may be removed or precipitated from spent Bayer solutions by:

(1) the precipitation of sodium carbonate monohydrate after concentration of the spent mother liquor by evapration;
(2) precipitation of sodium carbonate decahydrate by cooling the spent Bayer liquor without prior concentration by evaporation.

The method involving concentration followed by precipitation of sodium carbonate monohydrate is based on the decrease in solubility of the sodium carbonate with increase in caustic concentration. The precipitation of sodium carbonate decahydrate from spent Bayer liquor is based on the sharp decrease in the solubility of sodium carbonate decahydrate with decreasing temperature. One of the main difficulties of sodium carbonate removal involving evaporation and concentration of the spent Bayer liquor is that the solids precipitated from a high causticity, high organic-containing solution are difficult to separate because of small crystal size and the viscosity of the concentrated solution.

Heat balances and economics of the processes involving the separation of sodium carbonate from spent Bayer solution by concentration followed by crystallization and the separation of sodium carbonate from spent Bayer solution by cooling without prior concentration, followed by the precipitation and recovery of the sodium carbonate as sodium carbonate decahydrate, show that the removal of sodium carbonate from spent Bayer solution by cooling the spent Bayer solution to precipitate the sodium carbonate as sodium carbonate decahydrate is more economically attractive and possesses other unobvious advantages.

Figure 1:
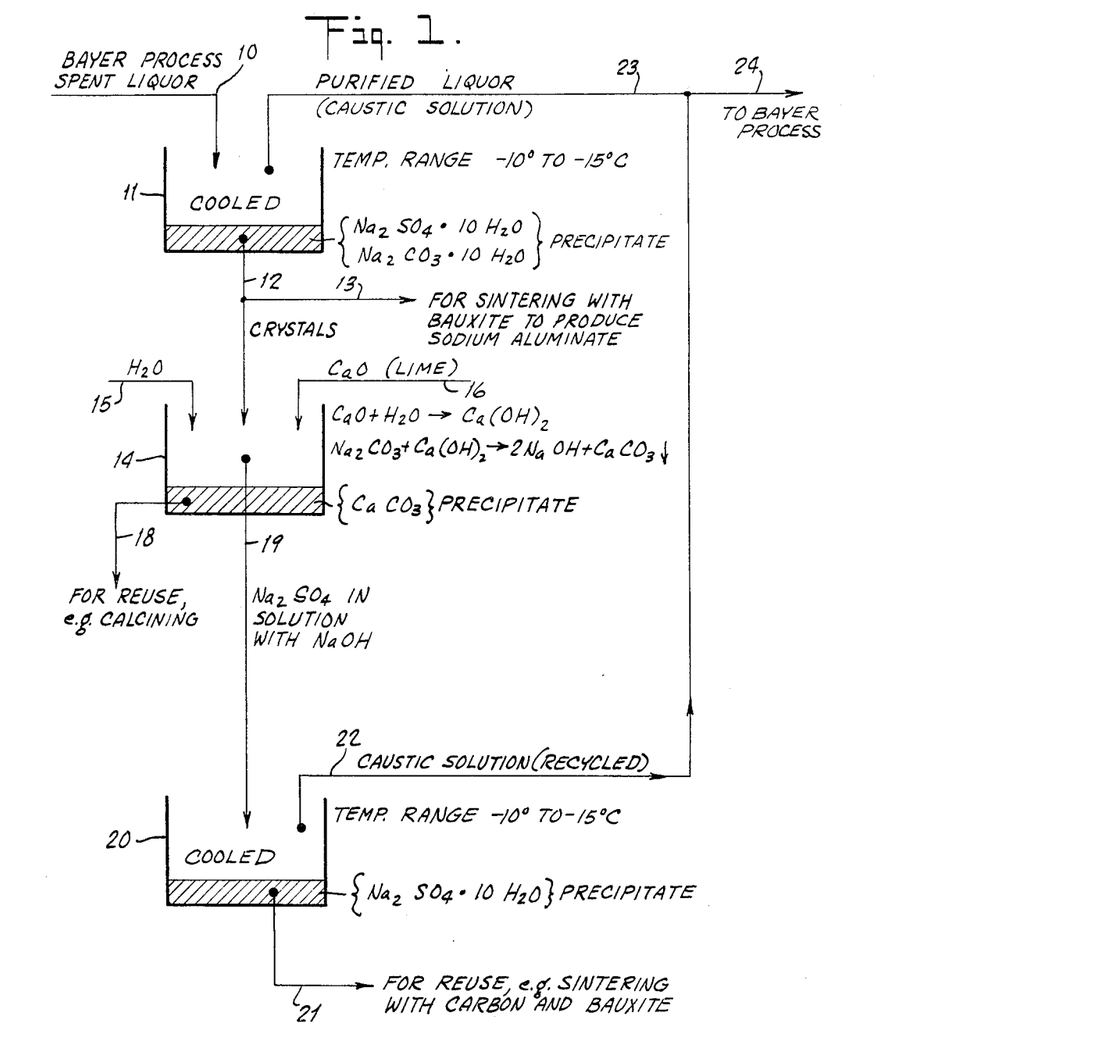

Referring now to FIG. 1 which schematically illustrates a flow scheme showing a practice of this invention, spent Bayer process liquor contaminated with sodium carbonate and sodium sulfate is supplied via line 10 to vessel 11 wherein it is coled by suitable means, not shown, to a temperature below about 10° C., such as a temperature in the range 0° C. to —20° C., e.g. a temperature in the range —10° C. to —15° C. and held at that temperature for a substantial period of time, such as 1/3–7 hours, more or less, to assure substantially equilibrium conditions and precipitation of substantially all of the available precipitable sodium carbonate and sodium sulfate under these conditions.

The resulting precipitated crystalline sodium carbonate decahydrate and sodium sulfate decahydrate are removed by suitable means, not shown, via line 12 and transferred to vessel 14 wherein the crystalline sodium carbonate decahydrate and sodium sulfate decahydrate are admixed with water supplied via line 15 and burnt lime supplied via line 16 to effect the causticization of the sodium carbonate in accordance with the chemical reactions:

Upon completion of the causticizing reaction the precipitated calcium carbonate is removed by suitable means, not shown, via line 18. If desired, the recovered calcium carbonate may be calcined to produce the burnt lime employed in the causticization reaction carried out within vessel 14.

The aqueous solution remaining in vessel 14 containing dissolved sodium sulfate and the dissolved sodium hydroxide or caustic formed during the causticization reaction is removed via line 19 and transferred to vessel 20. This solution is cooled in vessel 20 to a suitable low temperature below about 0° C., such as a temperature in the range —10° C. to —15° C., to effect precipitation of the precipitable sodium sulfate decahydrate under the conditions of temperature and solution composition and concentration maintained within vessel 20. The resulting precipitable sodium sulfate decahydrate is recovered by suitable means, not shown, via line 21. If desired, all or a portion of the crystals removed via lines 12 and 13 and/or the resulting sodium sulfate decahydrate recovered via line 21 may be causticized by sintering with an admixture of bauxite or alumina and carbon to yield a material after leaching, such as sodium aluminate solution, suitable for use in the Bayer process.

The solution remaining in vessel 20, now substantially depleted with respect to sodium sulfate in comprising essentially caustic, may be recycled via lines 22 and 24 to the Bayer process for eventual reaction with bauxite for the production of additional alumina. Likewise, the purified mother liquor remaining in vessel 11 after precipitation of the crystalline sodium carbonate decahydrate and sodium sulfate decahydrate, now having a substantial caustic content, may be recycled to the Bayer process via lines 23 and 24 for eventual reaction with bauxite for the production of additional alumina.

The following examples are illustrative of the practices of this invention:

EXAMPLE 1

A spent Bayer solution containing 200 grams per liter caustic and having 85% causticity and analyzing approximately 67.0 grams per liter $Al_2O_3$ and approximately 236 grams per liter TTS was maintained with stirring at a temperature of —10° C. for 5 hours. The resulting precipitate was recovered by filtration and washed with 200 grams per liter aqueous caustic solution which had been cooled to —10° C. until the filtrate was colorless. After removal of the occluded caustic by washing with alcohol and ether and after drying the resulting washed precipitate, the recovered solids were analyzed and identified as sodium carbonate decahydrate.

EXAMPLE 2

A sample of spent Bayer liquor, after having been cooled to a temperature of —20° C. for several days to remove the sodium carbonate therein, was evaporated to a caustic concentration of 200 grams per liter and a causticity level of 95%. Sodium sulfate was then added to a concentration of 60 grams per liter. The sodium sulfate was then precipitated from the resulting solution by cooling the solution to a temperature between —5° C. to —8° C. during a period of 5 hours with stirring. The precipitated sodium sulfate after separation, washing and analysis was identified as sodium sulfate decahydrate.

EXAMPLE 3

Tests were carried out to determine the solubility of sodium carbonate in synthetic spent Bayer plant solutions and in actual commercial spent Bayer plant solutions. The synthetic spent Bayer plant solutions were prepared from reagent grade sodium hydroxide, sodium carbonate and Bayer gibbsite. The percent causticity in the synthetic spent Bayer plant solutions ranged between 67-69%. The actual commercial spent Bayer plant solutions were prepared by first adjusting spent Bayer plant solutions to 150 grams/liter caustic, 0.30 alumina-caustic ratio and 70% causticity. The solutions were then evaporated to contain 200 and 250 grams/liter caustic.

The spent Bayer plant solutions undergoing tests were first reduced in temperature to 10° C. and samples taken 30 and 60 minutes after the solutions came to this temperature. The solutions were then reduced in temperature to 5° C. and samples again taken after 30 and 60 minutes at 5° C. These procedures were repeated as the temperature of the solutions was reduced to 0° C., −5° C., −10° C. and −15° C.

The samples taken from the solutions were analyzed for caustic, TTS, $Al_2O_3$ and $Na_2CO_3$ content. In addition, the actual plant solutions obtained after 1 hour at the above-identified temperatures were analyzed for sodium sulfate and $V_2O_5$. Also, the solutions obtained after 1 hour at −10° C. were analyzed for organic carbon and sodium oxalate.

Figure 2:
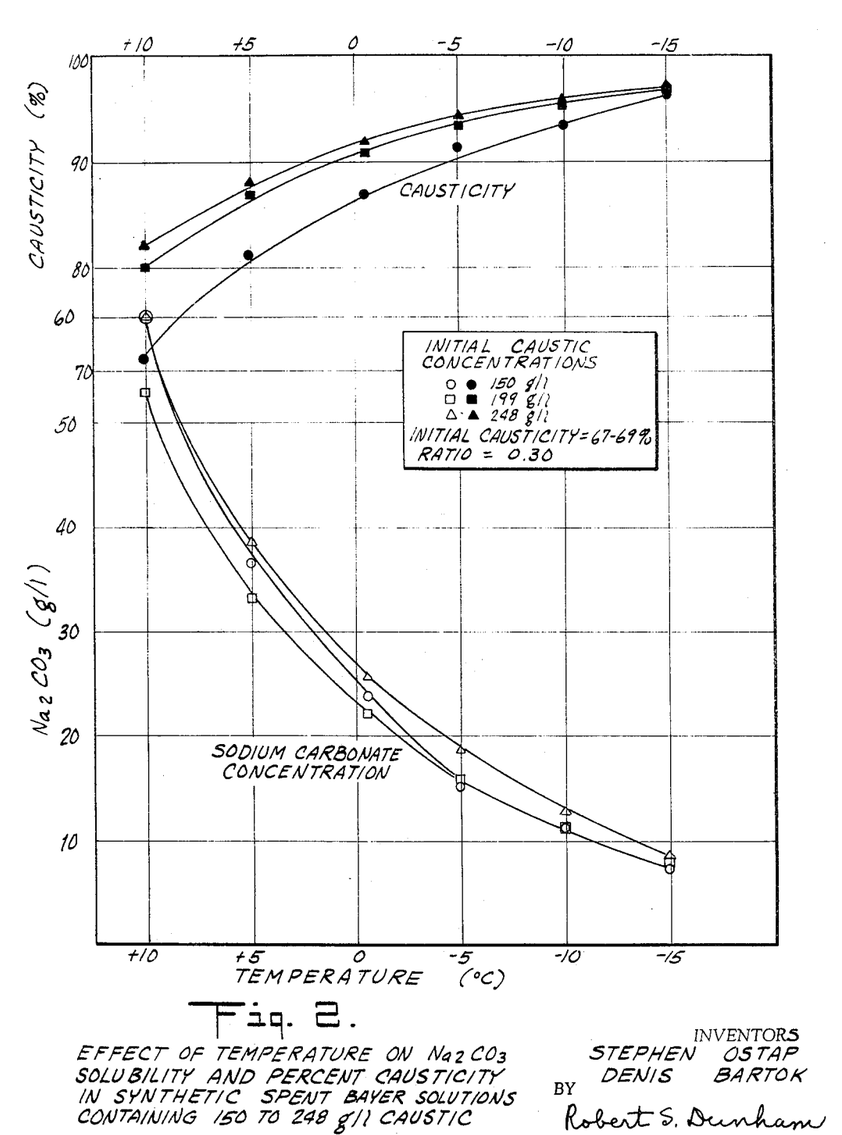
Figure 3:
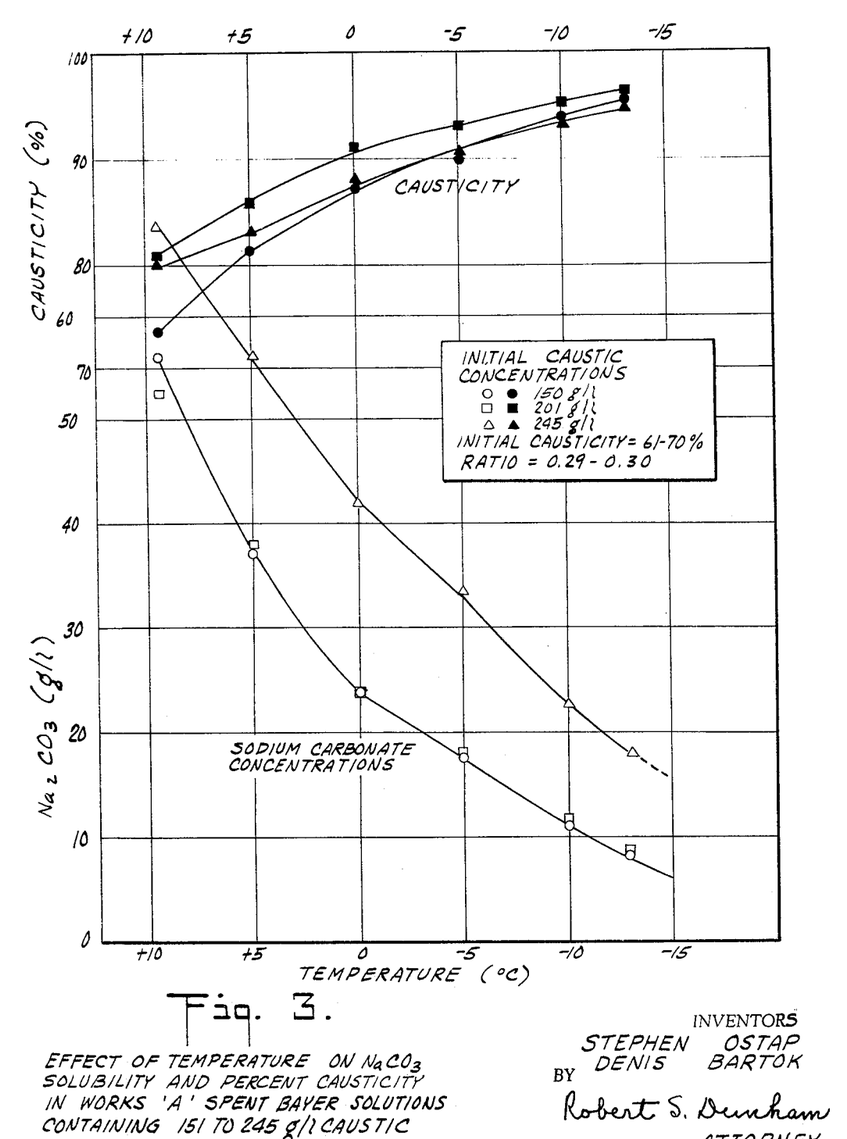
Figure 4:
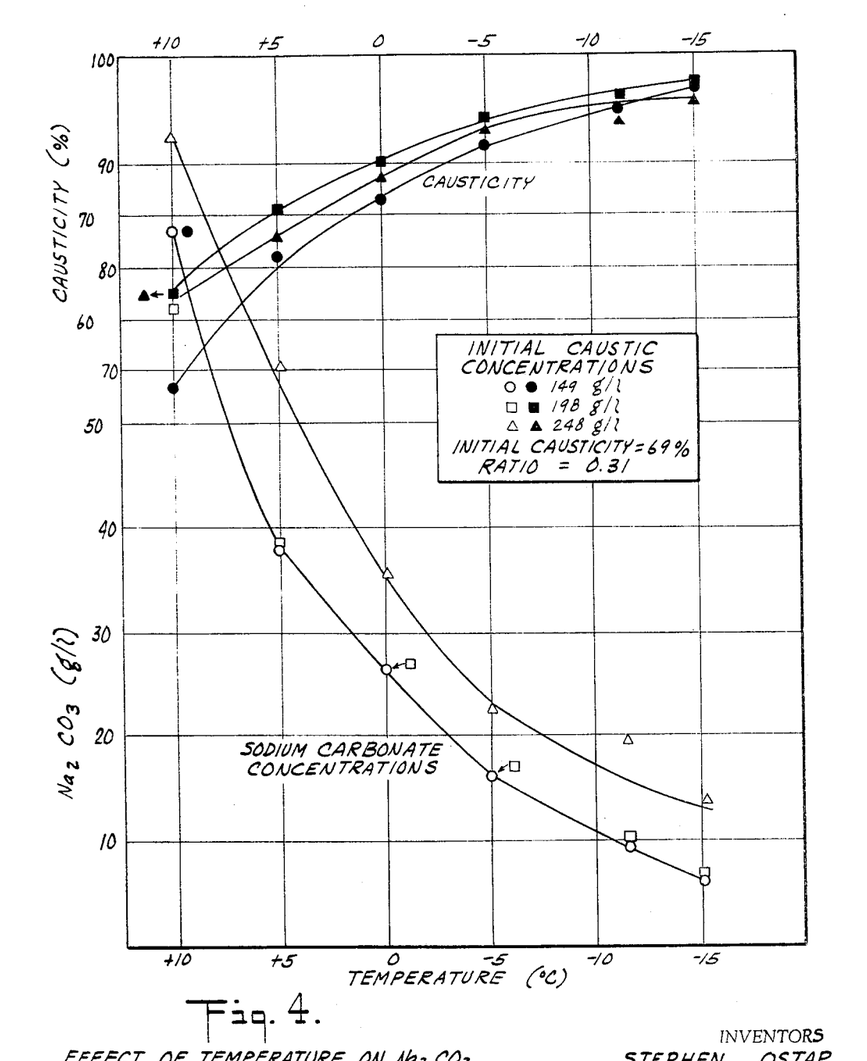

FIGS. 2, 3 and 4 illustrate the decrease in soda concentration and increase in causticity when cooling the test solutions from 10° C. to −15° C. at the three different caustic concentrations and holding 1 hour at temperature. It is pointed out that the caustic concentrations given in FIGS. 2, 3 and 4 are starting concentrations and not the actual concentration at the particular temperature. Since the soda precipitates at $Na_2CO_3 \cdot 10H_2O$, there is considerable water removal with increasing soda precipitation because of the water associated with the precipitated soda. There is also a corresponding increase in the concentration of the remaining solution components.

FIG. 2 shows that in the synthetic spent Bayer solution for the three caustic concentrations studied, the sodium carbonate decreased with decreasing solution temperature. Caustic concentration does not appear to have a significant effect on carbonate solubility in the caustic range tested. Accordingly, it would be advantageous to precipitate $Na_2CO_3 \cdot 10H_2O$ from a high caustic solution since, although the same carbonate level may be reached by precipitation, the resulting causticity is higher because of the higher caustic content of the solution. This is illustrated in the top curves in FIG. 2 in which the causticity at any particular temperature increases with increasing caustic in solution.

Referring now to FIG. 3 of the drawings, it should be observed that the initial caustic concentration between 150-200 grams/liter had no effect on carbonate solubility but there was observed an increase in solubility when the initial caustic was 245 grams/liter. This increase in solubility was great enough to offset the effect of the higher caustic concentration with the net result that the lower causticities were obtained in the 245 grams/liter caustic solution than in the 200 grams/liter solution at comparable temperatures. Thus, with actual plant spent Bayer liquors there is an optimum caustic concentration below or above which lower causticities will be obtained when precipitating $Na_2CO_3 \cdot 10H_2O$. Since this effect was not obtained with synthetic spent Bayer solutions this inhibiting is probably due to the concentration of Bayer impurities, e.g. organic carbon.

Referring now to FIG. 4 of the drawings, the same effect of caustic on carbonate solubility illustrated in FIG. 3 was also obtained with the actual spent Bayer liquors tested and illustrated in FIG. 4. Maximum equilibrium causticities were obtained when the solution evaporated to 200 grams/liter caustic. Evaporating to 248 grams/liter caustic increased the carbonate content to the extent that the causticity was decreased over that obtained at comparable temperatures with the 200 grams/liter caustic solution.

EXAMPLE 4

Figure 5:
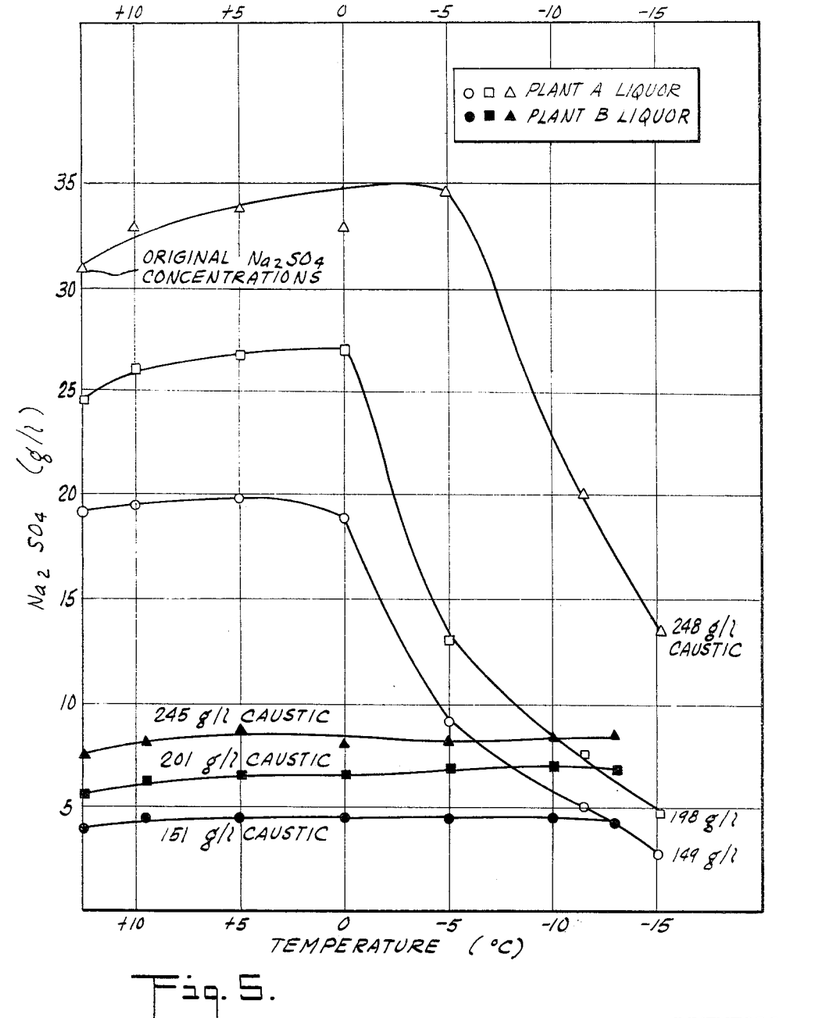

Tests were carried out on actual spent Bayer solutions to show the effect of decreasing solution temperature on the solubility of the sodium sulfate present in the spent Bayer solutions undergoing testing. The spent Bayer solutions tested contained from 150 to 250 grams/liter caustic and the solutions tested were kept at the designated temperatures for 60 minutes before sampling. The results of these tests are illustrated in accompanying FIG. 5. For Plant E spent Bayer solution originally containing 149 and 198 grams/liter caustic, there was no sodium sulfate precipitation down to 0° C. For the Plant E spent Bayer solution having 248 grams/liter caustic precipitation did not begin until the temperature decreased below −5° C. There was a sharp drop in sodium sulfate concentration upon further decreasing the temperature. The sodium sulfate solubility at comparable temperatures increased with increasing caustic concentration in solution and this effect is especially marked between 198 grams/liter and 248 grams/liter caustic. Plant A spent Bayer solution apparently contained insufficient sodium sulfate for precipitation to take place and the apparent increase in sulfate concentration with decreasing temperature exhibited by both Plant E and Plant A solutions is due to solution concentration caused by $Na_2CO_3 \cdot 10H_2O$ precipitation.

EXAMPLE 5

Tests were carried out to determine if soda would precipitate readily from low carbonate solutions, i.e. spent Bayer plant solutions having causticity of 85%. In carrying out these tests high caustic (200 grams/liter) actual spent Bayer plant solutions were prepared by cooling to 5° C. The resulting precipitated $Na_2CO_3 \cdot 10H_2O$ was filtered off and the solution adjusted to 200 grams/liter by evaporation. The resulting adjusted spent Bayer plant solution had a composition of 67.0 grams/liter $Al_2O_3$, 199 grams/liter caustic and 236 grams/liter TTS, i.e. 85% causticity.

The effect of stirring rate and $Na_2CO_3 \cdot 10H_2O$ seed addition on soda precipitation while cooling the test solution continuously from 25° C. to −10° C. was also observed. In one test the stirring rate of the agitator was 20 r.p.m. In another test the stirring rate was increased to 120 r.p.m. and in yet another test the stirring rate was increased to 120 r.p.m. and a seed charge of 100 grams/liter $Na_2CO_3 \cdot 10H_2O$ was added when the test solution reached 5° C. In these tests the solutions were not permitted to remain at any temperature for any length of time until the temperature of −10° C. was reached. This was done to determine what degree of supersaturation could be obtained under the different precipitation conditions. Samples were taken after the solution temperature had reached 3° C., −3° C., −5° C., −7° C. and −10° C. Additional samples were taken after the solutions had stood at −10° C. for 20 and 60 minutes. The times required for the solutions to reach sampling temperatures from a starting temperature of 25° C. are plotted across the center of FIG. 6. The results of these tests are illustrated in FIG. 6.

Figure 6:
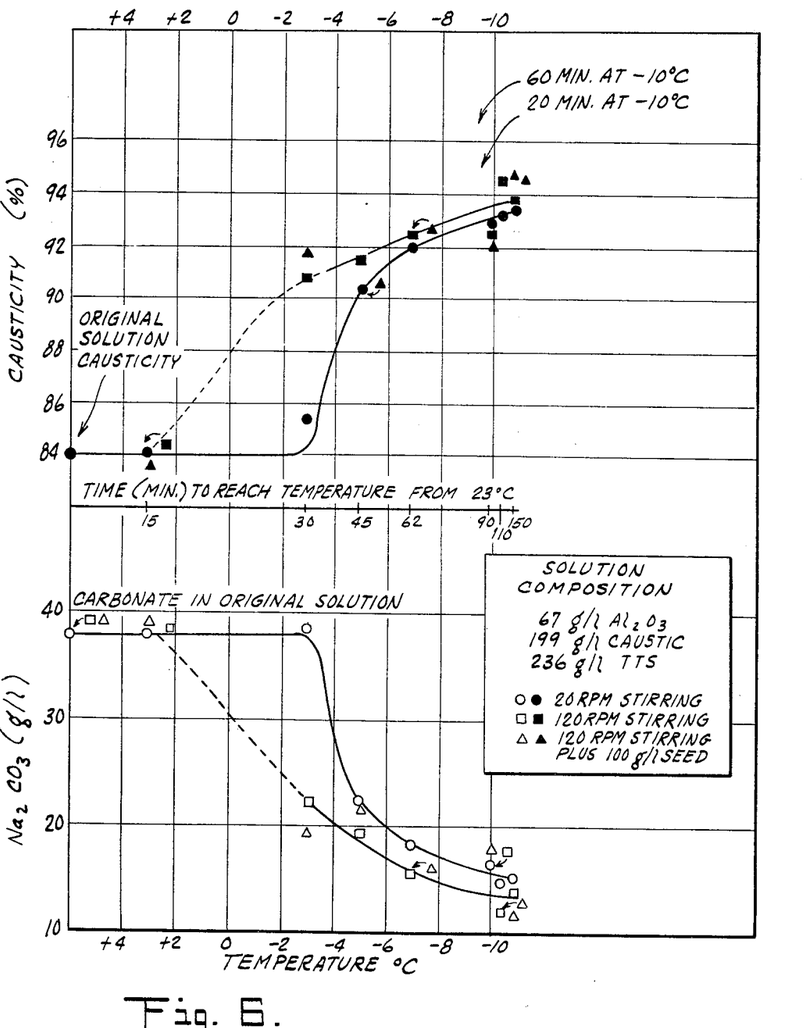

As illustrated in FIG. 6 soda precipitation took place at a lower temperature where the test solution was stirred slowly and there was no significant difference in causticity attained by adding $Na_2CO_3 \cdot 10H_2O$ seed where the solution was stirred at 120 r.p.m. Thus, it would appear, stirring promotes precipitation of soda.

The test results indicated that autoprecipitation of soda from a solution with 200 grams/liter caustic and 84% causticity begins somewhere between 3° C. and −3° C. and at about −3° C. in moderately and slowly stirred solutions, respectively. At the cooling rate employed in the test it would appear not possible to cool Bayer solution having a causticity of 85% to −10° C. without precipitating soda. With a greater rate of solution cooling, however, it might be possible to supercool to a greater degree. In these tests upon precipitation the causticity of the test solutions ranged from 92 to 93% with zero standing time at −10° C. and ranged as high as 94.5% upon standing at −10° C. for 20 minutes.

EXAMPLE 6

Tests were carried out to observe the precipitation of gibbsite from spent Bayer solutions which are cooled down to −10° C. Since spent Bayer solutions when cooled down to about −10° C. would be supersaturated with respect to gibbsite. It might be expected that gibbsite precipitation would occur. In actual plant operations precipitation of gibbsite from cooled, spent Bayer solutions supersaturated with gibbsite would be manifested by the formation of gibbsite scale in tanks and in conduits.

The precipitation of gibbsite was checked at −10° C. in high causticity (95%) actual plant spent Bayer liquor. In testing for gibbsite precipitation the test solutions were stirred and 60 grams/liter gibbsite seed were added. Before the gibbsite seed was added the temperature of test solution was lowered to −10° C. No precipitation of alumina from the spent Bayer liquor tested over the 24 hour precipitation period was observed. It appears that although spent Bayer solutions may be greatly saturated at −10° C. the reaction rate or precipitation rate is substantially nil at this temperature. It was observed that the ratio and causticity of the test solutions over the 24 hour precipitation tests were constant. This indicated that there is no precipitation of $NaAlO_2$ or any hydrate of $NaAlO_2$ at −10° C. since precipitation of appreciable quantities of $NaAlO_2$ would have resulted in a decrease in solution causticity.

EXAMPLE 7

Tests were carried out to determine the effect of recycling part of the precipitated crystalline sodium carbonate decahydrate to the cooled spent Bayer solution liquid during soda precipitation. Specifically, tests were carried out to determine whether or not the addition of crystalline sodium carbonate decahydrate recovered from a previous precipitation operation would produce a precipitated crystalline sodium carbonate decahydrate having a larger crystal size.

The tests were carried out on an 85% causticity actual spent Bayer plant solution containing 57.9 grams/liter $Al_2O_3$, 197 grams/liter caustic, 235 grams/liter TTS and 38.0 grams/liter $Na_2CO_3$. In cycle No. 1 500 ml. of solution were cooled to −10° C. and held for 30 minutes with stirring. Half of the resulting slurry was filtered to recover the precipitated sodium carbonate decahydrate and a sample was set aside for later examination. The remainder of the solids is used as seed in the next cycle. The procedure in cycle No. 2 and the remaining three cycles was to cool the spent liquor to 5° C. before adding the sodium carbonate seed. At this temperature there was no significant dissolution of the seed and no autoprecipitation of fines. The slurry was then cooled to −10° C. and kept at this temperature for 30 minutes.

The amount of slurry filtered during each cycle was that required to give as much seed as was obtained from the first cycle, i.e. seed charge used in each cycle was constant. In cycle No. 4, however, twice the required seed was recovered since the cycle No. 5 the precipitation volume was 1000 ml. instead of 500 ml. used in the previous four cycles. After precipitating the soda in this last cycle, the slurry was transferred to a 1000 liter graduated cylinder and the settling rate of the solids determined. The results of the settling rate tests are set forth in the accompanying table:

TABLE.—SETTLING RATE OF COARSENED SODA CRYSTALS IN SPENT BAYER PLANT SOLUTION

| Settling time (minutes) | Height of settled crystals (ml.)* | Supernatant liquid clarity |
|---|---|---|
| 25 | About 650 | Turbid. |
| 30 | About 400 | Do. |
| 35 | About 350 | Clear above 400 ml. |
| 40 | 320 | Approximately clear. |
| 45 | 310 | Do. |
| 60 | 300 | Clear. |
| 120 | 300 | Do. |

*Cylinder height was 13.3″ per 1000 ml.

The bulk of the precipitated material settled at 1.3 feet per hour, roughly twice the rate of the primary, autoprecipitated crystals.

The sodium carbonate decahydrate crystals from the five precipitation cycles were examined microscopically. In cycle No. 1 the average crystal length of the autoprecipitated material was about 50 microns. After the second cycle the average length was about 120 microns. Maximum crystal size appears to have been reached after the third cycle. The average crystal length was in the range 350–450 microns. These tests illustrated that under controlled precipitation conditions the crystal size of the sodium carbonate decahydrate precipitated from the cooled spent Bayer solutions may be increased by seeding with previously precipitated sodium carbonate decahydrate crystals, thereby facilitating the separation of the precipitated crystals from the mother liquor.

The foregoing tests show that Bayer solutions of 95% causticity may be obtained from spent Bayer solutions by cooling the spent Bayer solution to −10° C. and precipitating the sodium carbonate content as sodium carbonate decahydrate. Sodium sulfate, depending upon its initial concentration, will also be precipitated. Materials, such as sodium oxalate and organics present in the spent Bayer solution do not precipitate. It would appear to be fortuitous that organic material does not precipitate with the soda since the co-precipitation of the organic material with the sodium carbonate in the evaporation-salting out process for soda removal is claimed to be responsible for the small crystal size of the salted out soda. Therefore, since the organic material does not precipitate in the cooling process in accordance with this invention, the sodium carbonate decahydrate crystals may be obtained in large size, greatly facilitating separation from the mother liquor.

The design of a cooling circuit in a Bayer plant to precipitate soda from spent Bayer solutions in accordance with this invention would have to take into consideration the fact that an 85% causticity solution containing 200 grams/liter caustic cannot be cooled to −10° C. without causing the auto-precipitation of soda. The exact temperature at which auto-precipitation will take place will depend upon such facts as rate of cooling and agitation. However, scale formation in the cooling circuit would be expected to consist of $Na_2CO_3 \cdot 10H_2O$, $Na_2SO_4 \cdot 10H_2O$ or $NaF \cdot 2Na_3VO_4 \cdot 19H_2O$. This scale would be extremely water soluble and in no way resembling scales, such as gibbsite, boehmite, sodalite or oxalate.

The only apparent limit to the temperature used in the cooling process for soda removal would be the freezing point of the Bayer solution being treated. Ice formation should also be avoided since it represents a loss of energy. For a spent plant Bayer liquor containing 200 grams/liter caustic the freezing point is about −16° C. to about −17° C. Although the use of temperatures lower than −10° C. will result in more viscous solutions which might aggravate the separation of the precipitated crystalline sodium carbonate decahydrate, temperatures lower than −10° C., such as −15° C., may be employed. The lower weight per unit volume of soda precipitated may be compensated by treating more liquor. The amount of liquor to be treated to precipitate a given amount of soda to maintain a desired process causticity level will depend upon the amount of soda to be removed, the desired operating causticity level and the temperature used in the cooling process.

The co-precipitation of sodium sulfate with the sodium carbonate may be an advantage or disadvantage depending upon what is done with the precipitated soda to regenerate the caustic. If it is planned to sinter the soda with bauxite then the sintering or calcining conditions could be adjusted to destroy the sulfate as well as the carbonate. If, however, it is desired to causticize the soda with lime, then cooling is required to precipitate the sulfate. The precipitated sulfate may then be separated, dissolved and returned to the main plant stream with the causticized soda and reprecipitated again on the next cycle. The sodium sulfate could also be discarded or otherwise treated or disposed of to avoid build-up in the process streams.

As will be apparent to those skilled in the art in the light of the foregoing disclosure, many modifications, alterations and substitutions are possible in the practice of this invention without departing from the spirit or scope thereof.

We claim:

1. A process for the recovery of sodium carbonate and sodium sulfate from spent Bayer solution containing sodium carbonate and sodium sulfate dissolved therein, said spent Bayer solution additionally containing caustic and sodium aluminate dissolved therein, the amount of said caustic in said Bayer solution being in the range from about 150 grams per liter to about 250 grams per liter, the caustic being expressed as sodium carbonate, which comprises cooling said spent Bayer solution to a temperature in the range from about 0° C. to about —20° C. without any substantial ice formation and without freezing said Bayer solution and maintaining the resulting cooled spent Bayer solution at that temperature in the range from about 0° C. to about —20° C. for a period of time to assure substantially equilibrium conditions and precipitation of substantially all of the available precipitable sodium carbonate and sodium sulfate as sodium carbonate decahydrate and sodium sulfate decahydrate, at that temperature and recovering the resulting precipitated crystalline sodium carbonate decahydrate and sodium sulfate decahydrate.

2. A process in accordance with claim 1 wherein the precipitated crystalline sodium carbonate decahydrate is recovered by filtration from the cooled spent Bayer solution.

References Cited

UNITED STATES PATENTS

| | | | |
|---|---|---|---|
| 1,417,139 | 5/1922 | Burnham | 23—302 |
| 1,759,361 | 5/1930 | Miller et al. | 23—301 |
| 1,853,275 | 4/1932 | Houghton et al. | 23—40 |
| 1,869,621 | 8/1932 | Rosenstein | 23—63 |
| 2,294,778 | 9/1942 | Houghton | 23—301 |
| 2,347,053 | 4/1944 | Houghton | 23—63 |
| 2,963,363 | 12/1960 | Pilloton | 75—108 |

NORMAN YUDKOFF, Primary Examiner

R. T. FOSTER, Assistant Examiner

U.S. Cl. X.R.

23—63, 121; 62—58